United States Patent [19]

Groll

[11] 4,442,758

[45] Apr. 17, 1984

[54] PISTON MACHINE

[76] Inventor: Robert C. Groll, Cosimastrasse 227, D-8000 München 81, Fed. Rep. of Germany

[21] Appl. No.: 281,183

[22] Filed: Jul. 7, 1981

[30] Foreign Application Priority Data

Oct. 20, 1980 [DE] Fed. Rep. of Germany ....... 3039536

[51] Int. Cl.[3] .............................. F01B 9/00; F16J 1/10

[52] U.S. Cl. ......................................... 92/138; 92/143; 92/177

[58] Field of Search ........................ 92/138, 177, 143; 91/416, 415, 417, 437

[56] References Cited

U.S. PATENT DOCUMENTS

| | | | |
|---|---|---|---|
| 991,902 | 5/1911 | Schlosser et al. | 92/138 |
| 1,009,664 | 11/1911 | Hefty et al. | 91/437 |
| 1,183,973 | 5/1916 | Hewitt | 92/138 |
| 1,598,653 | 9/1926 | Peters | 92/177 |
| 1,791,672 | 2/1931 | Hinckley | 92/138 |
| 2,279,740 | 4/1942 | Matteson, Jr. | 92/177 |
| 2,472,647 | 6/1949 | Covins | 92/138 |
| 2,614,009 | 10/1952 | Butterfield | 92/138 |
| 3,168,854 | 2/1965 | Neilson | 91/437 |

*Primary Examiner*—Paul E. Maslousky

*Attorney, Agent, or Firm*—Karl F. Ross; Herbert Dubno

[57] ABSTRACT

A piston machine, e.g. an internal-combustion engine, compressor or pump, in which a piston is reciprocatable in a cylinder and crankshaft is provided with an eccentric pin received in a transverse slot of the piston and preferably in a massive portion of the body thereof, so that piston rods and the like are avoided.

4 Claims, 7 Drawing Figures

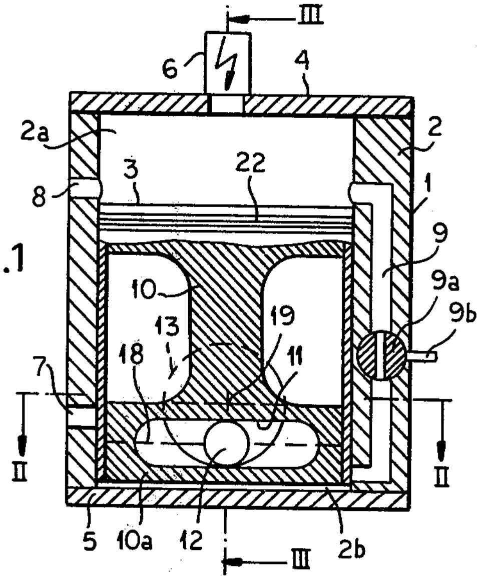
Fig.1
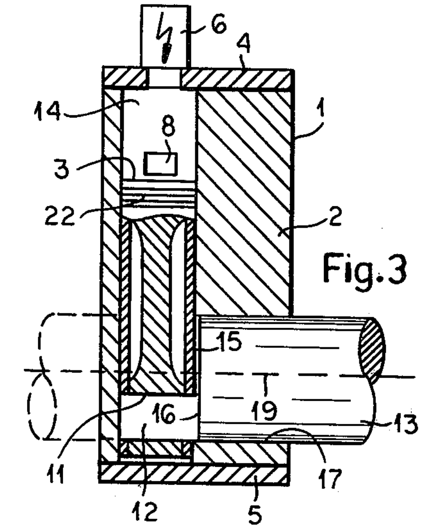
Fig.3
Fig.2
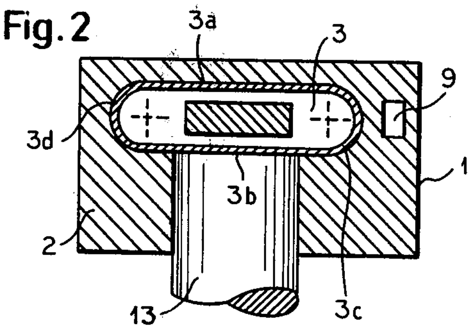
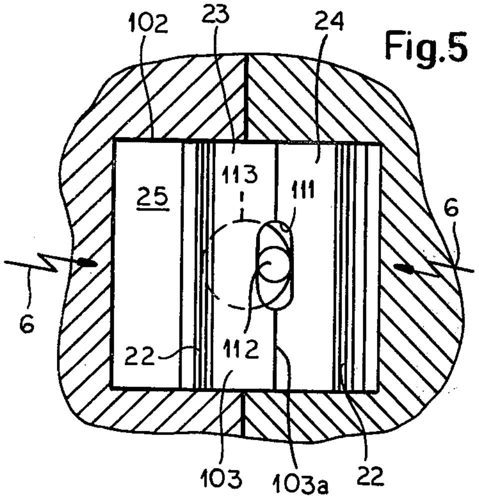
Fig.5
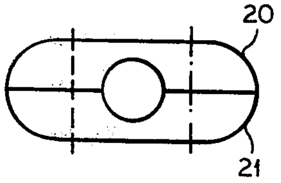
Fig.4
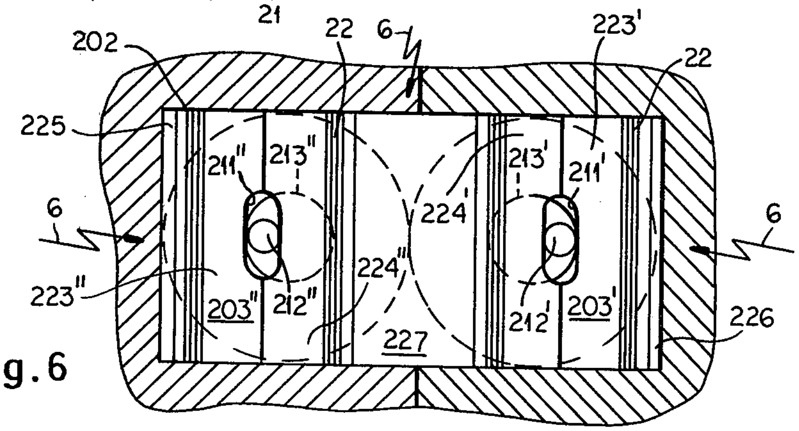
Fig.6

PISTON MACHINE

FIELD OF THE INVENTION

My present invention relates to a piston machine and, more particularly, to a machine having at least one piston reciprocatable transverse to the axis of a shaft coupled with this piston and formed as a crankshaft for driving the piston or being driven by the piston.

BACKGROUND OF THE INVENTION

Piston machines are provided for many purposes and in a wide variety of constructions and operating modes and such machines can be utilized as internal-combustion or expansion engines, as compressors or pumps, or wherever expansion of a fluid is intended to drive a piston or the reciprocation of a piston is intended to compress or displace the fluid.

It is common practice to provide the machine with one or more pistons which can be reciprocatable in respective cylinders, this term being used to designate a chamber whose volume can vary with reciprocation of the piston.

Where the piston is linearly reciprocated, it is usually connected via a piston rod directly or indirectly to a crankshaft so that, depending upon the nature and construction of the machine, the crankshaft can be driven by the reciprocation of the piston or the reciprocation of the piston can drive the crankshaft.

In an internal-combustion engine, for example, a fuel-/air mixture is introduced into the piston chamber or cylinder and is fired during an Otto or Diesel cycle, with the expanding gas mixture driving the piston to apply torque to the crankshaft.

In a compressor, however, rotation of the crankshaft displaces the piston to compress a fluid. In both cases intake and/or exhaust valves may be provided in a cylinder head or the engine or compressor body to control the flow of the fluid into and out of the compartment.

Because of the arrangement of the piston, piston rod and crankshaft were hitherto considered to be necessary to perform useful work with such machines, the overall size and especially the height of the machine was considerable. The height of the machine can be reduced by limiting the stroke of the piston but this, in turn, provides a limitation on the displacement of the machine and hence its capacity. Furthermore, for tolerable efficiencies, the strokes cannot be decreased beyond a certain limit and thus relatively large engine or compressor heights have had to be tolerated heretofore.

The piston rod construction also has the disadvantage that relatively large amounts of energy and force must be transmitted by the piston rod and its bearings and frequently the piston rod was subject to breakage or considerable wear which resulted in high maintenance cost for the machine, interruption in the operations thereof and the like. The danger of breakage and other difficulties of a similar nature increases with the length of the piston rod. Attempts to eliminate these dangers by making the piston rod especially massive have created their own problems with respect to wear and cost.

It is for this reason that investigations have been undertaken into so-called rotary-piston engines; such engines generally eliminated the piston rods and afforded a more direct approach to the transmission of torque from the piston to the shaft and vice versa of the machine.

Increasing experience with rotary-piston engines and compressors has shown that, while such machines are more compact than the piston-rod machines described previously and are capable of transmitting torques with reduced inertial effects and without some of the disadvantages of piston rod machines, the rotary-piston machines have problems regarding sealing of the compartments which cannot readily be overcome.

OBJECTS OF THE INVENTION

It is the principal object of the present invention to provide a piston machine which is free from the disadvantages of earlier piston machines and yet is compact, efficient with respect to force transfer, is less subject to wear than earlier machines and, in general, is more efficient.

Another object of the invention is to provide a machine of the reciprocable piston type which runs efficiently and uniformly, is subjected to reduced vibration and wear, and which suffers less from the danger of breakage.

It is also an object of this invention to provide a piston machine, especially an engine or compressor, requiring less material for its fabrication for a given power and affording improved characteristics.

SUMMARY OF THE INVENTION

These objects and others which will become apparent hereinafter are achieved according to the invention, in a reciprocating-piston machine comprising at least one cylinder, e.g. formed in a cylinder block, a piston reciprocatable in the cylinder and defining at least one variable-volume chamber therewith, and a crankshaft having an eccentric portion, e.g. a crankpin received in a transverse slot formed directly in the piston. The term "transverse slot" is intended to describe a slot which is elongated in a direction perpendicular to the direction of reciprocation of the piston and to the axis of the crankshaft. The "direct" formation of the slot in the piston means that the usual piston rod which is articulated to the piston and to the crankpin is entirely eliminated.

Preferably the slot is formed in a massive or solid portion of the piston.

By eliminating the usual piston rod which has heretofore been required to couple the piston to the crankshaft, the engine can be made so as to have a significantly reduced height which enables the engine, for a given power output, compression ratio and engine displacement, to have a volume comparable to that of a rotary piston engine and even a height which need not exceed that of a rotary piston engine. However, the engine of the invention has the advantage over the rotary piston engine in that it can use conventional reciprocating-piston seals thereby eliminating the sealing problem which has characterized rotary piston engines heretofore.

Since the crankshaft acts directly upon the piston in the system of the present invention or vice versa, the mass which must be displaced is significantly reduced by comparison with engines utilizing piston rods. The results are higher energy efficiency and a saving in material and weight which, in turn, can allow vehicles in which the engine is incorporated to obtain better fuel mileage. The saving in material and elimination of the piston rods, moreover, results in a reduction of the cost of the engine and even in repair and maintenance costs.

Since, with respect to the axis of the crankshaft, the center of gravity of a piston rod is offset, the engine of the present invention which eliminates such piston rods does not have significant displacement or throw of eccentric masses so that the engine runs more smoothly with less vibration. Furthermore, the force transmission between the crankshaft and the piston follows more closely the ideal sine curve from which piston rod force transmission deviates significantly.

The direct action of the crankshaft on the piston body or vice versa also provides advantages with respect to cooling since it is possible to provided a hollow crankshaft which is transversed by the coolant and which delivers the coolant effect to the hottest portions of the engine, generally the pistons, in a manner which is not possible when a piston rod is interposed between the piston and the crankshaft.

According to a feature of the invention, the piston is a flat body, i.e. has an elongated and generally flattened cross section with, for example, parallel sides and rounded ends or a generally oval or elliptical cross section. Since the crankpin traverses the piston body directly, in accordance with the invention, the flat piston allows this pin to be comparatively short and of limited diameter, thereby further effecting a saving in a material, mass and cost. Flat pistons also have the advantage that in multicylinder in-line or row-cylinder engines, the axial length of the engine can be held to be relatively small. Such extremely short machines can be accommodated wherever a limited space is inherent to the application, e.g. in two-wheel vehicles such as motorcycles, light cars and the like.

With flat pistons, the transition region in the cylinder block between the crankshaft bearings and the piston can be relatively simpler since the bearings can run directly to planar surfaces. This is not possible when the piston has a cylindrical configuration.

With multicylinder piston machines with flat pistons, it is desirable that the crankshaft be made in one piece and that the cylinders be provided in the aforementioned cylinder block. Thus according to the invention, each of the pistons can be divided in the region of the transverse slot and the parts connected together after being placed around the crankpin. The cylinder block also advantageously is divided in a plane substantially in the region of the crankshaft bearings and preferably in a plane of the axis of the crankshaft to allow the bearings and the crankshaft to be inserted.

With this construction a one-piece forged crankshaft can be used, the assembly of the cylinder, pistons and other portions of the engine can be simplified and repair or replacement of parts can be effected in a simple, time-conserving and economical manner.

According to another feature of the invention, a slide block or the like is provided in the transverse slot in the piston and engages the crankpin. This slide block serves as a bearing forming a journal for the crankpin in the piston and can be subdivided into the interconnected parts in a manner similar to the manner in which the piston is subdivided. This slide block not only reduces wear and friction but can be readily replaced. The slide block, like the other parts of the invention can be readily fabricated by mass production techniques.

While flat pistons have been proposed heretofore in association with conventional piston rod systems, the present invention provides, by contrast with these earlier systems, that both ends of the flat piston be closed so that working compartments can be formed to either side of each piston, the transverse slot being provided substantially in the middle of the massive piston body. This further reduces wear and even eliminates the danger of breakage of the piston in the region of the transverse slot.

The term "working compartment" is used herein to refer to the variable-volume compartments of piston machines and can include, for example, the firing or explosion compartment of an internal combustion engine, a precompression compartment for compressing a fuel/air mixture before its injection or introduction into an explosion compartment, a compartment in which a gas is compressed, e.g. when the machine is a compressor, or any other compartment whose variable volume is of advantage in operation of the machine.

In practice, the compartment is provided with inlet and outlet (intake and discharge) passages with or without independently operating valves. It has been found to be advantageous to provide a bypass passage in the cylinder block to enable the compartments on opposite sides of a relatively simple piston with closed top and bottom to function in an engine in accordance with the two-stroke principle. The closed bottom of the piston provides the additional advantage that the filling of the combustion chamber with the explosive gas mixture is more efficiently and more completely carried out in a precise manner. The two-stroke engine of the invention, therefore, can operate significantly more efficiently than earlier two-stroke systems.

Another advantage of the system of the invention in the two-stroke engine mode, is that the closed bottom can operate as a piston against a trapped air cushion in which case additional valves can be built into the bypass passages, to provide a measure of engine braking.

With a system of the invention, the cylinder can be closed on opposite sides and can define with a double piston, either two firing compartments or a firing compartment and a precompression compartment. The result is that a single piston in a single cylinder compartment can act in a manner similar to that of conventional two-cylinder machines and wherever precompression is desired as, for example, in Diesel operations.

According to yet another feature of the invention, in a cylinder closed on opposite sides, two double pistons are provided with the space between them forming a third working compartment, e.g. a firing compartment or a charging compartment. The versatility of this arrangement can be used to increase the displacement of an internal combustion engine or the output of a compressor.

BRIEF DESCRIPTION OF THE DRAWING

The above and other objects, features and advantages of the present invention will become more readily apparent from the following description, reference being made to the accompanying drawing in which:

FIG. 1 is a simplified section of a single cylinder internal combustion engine according to the invention;

FIG. 2 is a section taken along the line II—II of FIG. 1;

FIG. 3 is a section taken along the line III—III of FIG. 1;

FIG. 4 is a detail view of a slide block, greatly enlarged in scale, for use in the engine of FIG. 1;

FIG. 5 is a diagrammatic side view in cross section through a piston machine having a double piston;

FIG. 6 is a diagram similar to FIG. 5 showing two double pistons in one cylinder.

SPECIFIC DESCRIPTION

Figure 7:
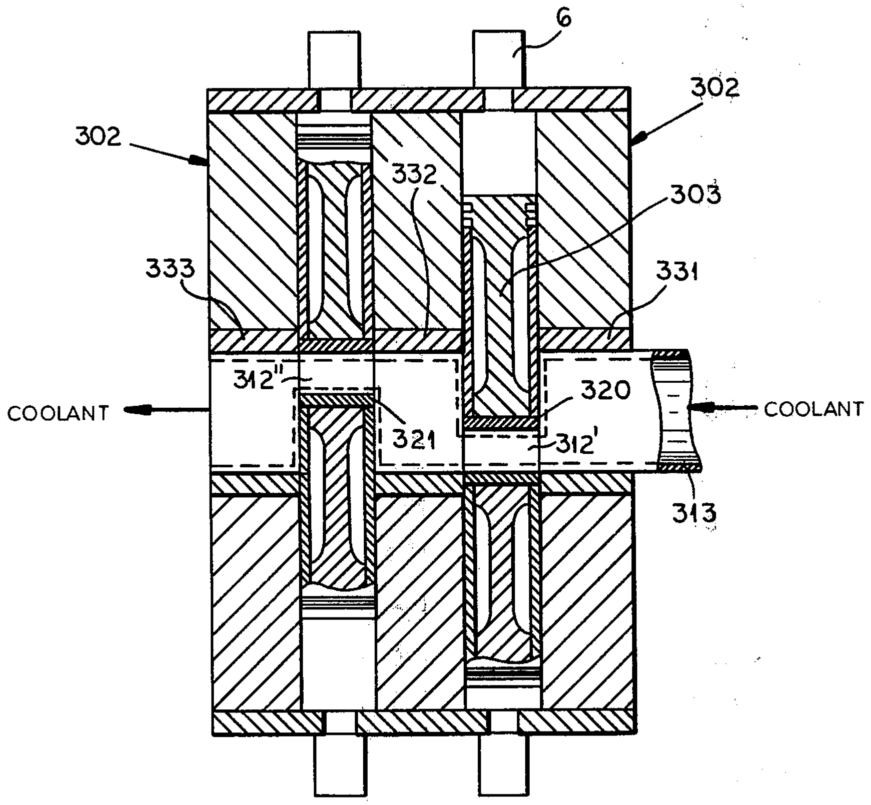
FIG. 7 is a view similar to FIG. 3 showing a portion of a multicylinder engine according to the invention.

In the engine diagrammatically represented in FIGS. 1 through 3, the engine block is represented at 1 and comprises a cylinder 2 in which a flat piston 3 is reciprocable, the cylinder being covered at its opposite ends by plates 4 and 5.

Plate 4 is provided with a spark plug 6 and the cylinder block is provided with an intake passage 7 and the discharge passage 8 which communicate with the cylinder.

The block is also formed with a bypass passage 9 which can be formed with a valve 9*a* operated by a handle 9*b* to throttle the passage 9 or block the latter when engine braking against an air custion is desired. In engine braking therefore the valve 9*a* forms a resistance to flow through the bypass passage to provide a drag.

The engine is thus a two-stroke engine operating in accordance with the principles described.

The piston 3 is not only closed at its end turned toward the explosion compartment 2*a* but is also provided with a closed end turned toward the other compartment 2*b*, the piston being formed at its ends by a massive body 10.

In the bottom portion 10*a* of this massive body 10, which is of increased thickness, there is formed a transverse slot 11 in which the crankpin 12 of a crankshaft 13 engages.

As can be seen from FIG. 2, the piston 3 is a flat piston, i.e. has parallel surfaces 3*a* and 3*b* and rounded ends 3*c* and 3*d* as seen in cross section.

In the axial dimension of the pin 12 and the crankshaft 13, therefore, the piston is relatively thin so that the pin 12 is correspondingly short. Furthermore, the cylinder space 14 is divided between parallel walls 15 while the crankshaft can have a planar shoulder 16 which can terminate substantially flush with one of these walls to minimize sealing problems and the transition between the crankshaft bearings and the piston. As a result, no dead space is provided as would be the case if the piston were cylindrical.

As shown in FIGS. 1 through 3, the cylinder 2 and the piston 3 can each be of two-piece construction so that the crankshaft 13 is inserted from one side into the bearing 17 of cylinder 2 enabling the pin 12 to project into the slot 11.

In this case, a multicylinder construction requires a number of cylinder blocks 1 to be assembled together and the crankshaft 13 to be subdivided into a plurality of sections one of which is shown in solid lines while the other is shown in broken lines in FIG. 3.

However, it is preferred to operate with a one-piece crankshaft (see FIG. 7) and in this case both the piston and the cylinder block can be made in two-piece constructions, i.e. can be divided along the planes represented by the broken lines 18 and 19 so that the crankshaft can be inserted and can be removed upon disassembly.

As can be seen from FIG. 4, the force transfer between the crankpin and the walls of the slot can be improved by providing the engagement free from play. In this case, a slide block as shown in FIG. 4 is utilized to form a bearing in which the pin 12 is journaled, this block sliding back and forth in the slot 11. The slide block is formed from two parts 20 and 21 which can be bolted together or can simply be held in the slot 11 so that these parts can be replaced, like the piston rings 22, as need arises.

When the system of FIGS. 1 through 3 is also used for engine braking, the reinforced bottom 10*a* of the piston should also be provided with piston rings so that the desired compression effect can be generated in compartment 2*b*.

FIG. 5 shows an arrangement in which, within the cylinder 102, the piston 103 functions as a double piston and consists of two mirror-symmetrical halves 23, 24 which are assembled together along the plane 103*a* to define the slot 111 in which the crankpin 112 of the crankshaft 113 is received.

In this arrangement, either or both of the compartments 25, 26 can serve as firing compartments although it may be advantageous to provide the compartment 26 as a precompression compartment for compartment 25 when the engine is to be operated by diesel principles.

FIG. 6 shows yet another embodiment of the invention utilizing essentially the same principles. In this case, two double-acting pistons 203', 203" are provided within a single cylinder 202 defining working compartments 224, 226 and 227, i.e. a third combustion chamber 227 between the two pistons. The compartments 225 and 226 can function as charging-pump chambers for the compartment 227 if desired. The two crankshafts 213', 213" whose pins 212', 212" engage in the slots 211', 211", can be connected by meshing gears 230 for synchronous operation. Each of the pistons can be divided and assembled in the manner described from two parts 223', 224'; 223", 224".

A multicylinder row-type engine has been shown in FIG. 7 utilizing, for each cylinder 302, a double piston 303 with a slide block 320, 321 between the crankpins 312' and 312" of the crankshaft 313. The system of FIG. 7, which has crankshaft bearings 331, 332, 333 extending flush with the walls of the respective cylinder 301, can operate in the manner described. The crankshaft can be made hollow as shown in the right-hand end of FIG. 7 to enable a coolant to be fed therethrough for cooling of the engine or compressor and lubrication can be facilitated by forcing a lubricant to the surfaces of the moving parts more readily with the system of the present invention than with conventional arrangements.

I claim:

1. A piston machine comprising a body formed with at least one cylinder having planar opposite walls and an elongated cross section with a width across said walls less than a width parallel thereto, a piston reciprocatable with said cylinder, said piston being flat and having substantially planar opposite sides, said piston having massive portions spaced apart in a direction of movement of said piston and rounded edges extending in said direction, and a crankshaft journaled in said body and having at least one crankpin, said piston being formed directly with a throughgoing transverse slot in one of said massive portions receiving said pin perpendicular to said sides, whereby said crankshaft is coupled to said piston, said pin having a length equal to said width across said walls.

2. The machine defined in claim 1 wherein said piston is subdivided in the region of said slot and said body is subdivided in the region of said crankshaft thereby enabling mounting and dismounting of said crankshaft.

3. The machine defined in claim 1, further comprising a slide block rotatably journaling said pin and received in said slot, said slide block being subdivided into two separable parts.

4. A piston machine comprising a body formed with at least one cylinder having planar opposite walls and an elongated cross section with a width across said walls less than a width parallel thereto, a piston reciprocatable in said cylinder, said piston being flat and having substantially planar opposite sides, said piston having massive portions spaced apart in a direction of movement of said piston and rounded edges extending in said direction, and a crankshaft journaled in said body and having at least one crankpin, said piston being formed directly with a throughgoing transverse slot in one of said massive portions receiving said pin perpendicular to said sides whereby said crankshaft is coupled to said piston, said pin having a length equal to said width across said walls, said body being formed with a bypass passage connecting compartments in said cylinder adjacent opposite ends of said piston, and a valve in said passage for braking reciprocation of said piston in a position of said valve unblocking said passage.

* * * * *